(12) United States Patent
Abushagur et al.

(10) Patent No.: US 7,265,476 B1
(45) Date of Patent: Sep. 4, 2007

(54) MEMS MICRO-TRANSLATION DEVICE WITH IMPROVED LINEAR TRAVEL CAPABILITY

(75) Inventors: Mustafa A. G. Abushagur, Rochester, NY (US); Cynthia K. Ferguson, Huntsville, AL (US); Gregory P. Nordin, Huntsville, AL (US); Jennifer M. English, Madison, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 371 days.

(21) Appl. No.: 10/975,121

(22) Filed: Oct. 26, 2004

Related U.S. Application Data

(60) Provisional application No. 60/516,597, filed on Oct. 31, 2003.

(51) Int. Cl.
*H02N 1/00* (2006.01)
(52) U.S. Cl. .................................................. 310/309
(58) Field of Classification Search .................. 310/309
See application file for complete search history.

(56) References Cited

U.S. PATENT DOCUMENTS 5,055,731 A * 10/1991 Nihei et al. .................. 310/309
5,378,954 A * 1/1995 Higuchi et al. .............. 310/309
5,986,381 A * 11/1999 Hoen et al. .................. 310/309
6,525,446 B1 * 2/2003 Yasuda et al. .............. 310/309

FOREIGN PATENT DOCUMENTS

JP 63-136982 * 6/1988
JP 6-0865570 * 3/1994

* cited by examiner

*Primary Examiner*—Karl Tamai
(74) *Attorney, Agent, or Firm*—James J. McGroary; Ross F. Hunt, Jr.

(57) ABSTRACT

A microscopic translation device for a microelectromechanical system includes a pair of linear stator assemblies disposed in spaced relation to define an elongate channel. Each assembly is formed by a plurality of stators arranged in a row along the channel. A shuttle member is disposed between the stator assemblies for translating movement along the channel. The shuttle member includes a plurality of rotors extending outwardly from opposite sides. The shuttle is grounded through the stator assemblies and includes a mounting area for an object to be translated. Electrical lines are individually connected to alternate stators of a plurality of groups of the stators. A current supply sequentially supplies current through the electrical lines to the alternate stators so as to effect charging of the stators in a predetermined sequence. This produces a tangential capacitive force that causes translation of the shuttle.

34 Claims, 4 Drawing Sheets

MEMS MICRO-TRANSLATION DEVICE WITH IMPROVED LINEAR TRAVEL CAPABILITY

CROSS REFERENCE TO RELATED APPLICATIONS

This application claims benefit of U.S. Provisional Application No. 60/516,597, filed Oct. 31, 2003.

ORIGIN OF THE INVENTION

This invention described herein was made in part by an employee of the United States Government and may be manufactured and used by or for the Government of the United States of America for governmental purposes without the payment of any royalties thereon or therefor.

FIELD OF THE INVENTION

The present invention relates to microelectromechanical systems (MEMS) and, more particularly, to translation devices for said systems.

RELATED ART

New developments of micromechanical devices using integrated circuit (IC) fabrication methods allow the reduction of typical macro-sized mechanical sensors, actuators, and mechanisms to micron sizes. These micromechanical devices can be fabricated on the same chip as the IC microelectronics, thus allowing for batch production of miniaturized electromechanical systems that do not require integration. Since microelectromechanical systems are smaller, lighter, less expensive, and typically more accurate than many of their macro-counterparts, a number of new commercial MEMS products are emerging, including accelerometers used in automobile airbags, gyroscopes, sensors, and fiber optic systems.

Micro-machined mechanical devices were placed on IC chips as early as the 1960's in the forms of solid state pressure and accelerometer transducers but the significant advances in MEMS began in 1987.

The most common MEMS actuation device for linear translation is the electrostatic comb device or comb drive, which utilizes electrostatic capacitive forces to move an interdigitated finger structure, i.e., a comb that is suspended by springs (see J. D. Grade, and H. Jerman, "MEMS Electrostatic Actuators for Optical Switching Applications," Optical Fiber Communication Conference and Exhibit, OFC 2001, Mar. 21, 2001, Vol. 3, pp. wx2-1-wx2-3). When a voltage is applied to one side of the comb device while the other side is grounded, translating fingers of the comb are pulled into a cavity between the interdigitated stationary fingers of the comb, due to capacitive forces. However, the spring design of the comb has limited this resonating type structure to maximum translations of only 200 microns, in accordance with current research (see J. D. Grade, and H. Jerman, "A Large-Deflection Electrostatic Actuator for Optical Switching Applications," Solid-State Sensor and Actuator Workshop. Hilton Head Island, S.C., Jun. 4-8, 2000, pp. 97-100). This limitation makes this method less optimum for some applications, and particularly those that require greater translation capabilities. The other constraint with resonating comb drives is that these drives are not able to provide discrete translation steps between the two maximum variances.

Another device used for micro-translation employs microelectrostatic rotating motors controlling linear gear trains. Electrostatic rotors/stators on a bottom layer of the device form a rotary electrostatic motor that turns a driving gear on a top layer, which, in turn, drives linear translation drive of the gear train. Although this method can be very accurate for stepping applications, the unique tribology of MEMS causes the intricate gears to fail after a short operational lifetime (see E. J. Garcia and J. J. Sniegowski, "Surface Micromachined Microengine as the Driver for Micromechanical Gears," Transducers '95, Eurosensors IX, The $8^{th}$ International Conference on Solid-State Sensors and Actuators, and Eurosensors IX, Stockholm, Sweden, June 25-29,1995, pp. 365-368).

A Scratch Drive Actuator (SDA) is another device that is commonly used as a linear translation actuator. The SDA uses capacitive forces to move an L-shaped cross-sectional object across a flat plane, similar to the motion of an inchworm. Although these devices provide a large translation, the steps are not physically defined. This could cause the actuator to experience a translation error accumulation over large distances, causing problems with repeatability and the need for an additional sensing device to determine the precise location of the actuator. SDAs are also limited to actuation in only one direction-(see S. S. Lee, E. Motamedi, and M. C. Wu, "Surface-Micromachined Free-Space Fiber Optic Switches with Integrated Microactuators for Optical Fiber Communication Systems," Transducers '97, 1997 International Conference on Solid-State Sensors and Actuators, Chicago, Jun. 16-19, 1997, pp. 85-88).

The scientific literature describes other actuators for linear translation. However, devices (e.g., thermal actuators) that can produce large translations are typically slow whereas devices (e.g., piezoelectric actuators) that are fast typically do not provide large translations.

Despite the advances that have been made, current MEMS technology has not produced a linear actuator that is capable of traveling over 250 microns while providing the desired speed and accuracy. Although the present invention is not limited to such an application, one reason why this particular travel distance is important is that fiber optic cables are 250 microns in diameter, including the cladding and protective shell. This means the fiber optic cables must have a spacing of at least 250 microns between cable centerlines. In one type of fiber optic switch, a mirror or lens must be placed in the path of the fiber optic cable to direct the path to one of many output fiber optic cables. In order to do this with linear translation, the mirror or lens must be capable of moving at least 250 microns in order to interfere, and not interfere, with the light path, and to thereby create the switch. Therefore, a key requirement for a translation stage in this environment is that it must be able to travel over 250 microns.

Speed is also a consideration when performing fiber optic switching. Current fiber optic switches on the market today have a switching time of around 25 milliseconds and it is desirable to at least maintain this switching time in any translation device. Accuracy, a requirement based on the amount of light loss by the switch, is also very important.

Structures from the 1980's were typically fabricated by depositing and etching thin films using sputtering, chemical vapor deposition, wet etching, Reactive Ion Etching, lift off and other methods developed in connection with IC technology. Materials were usually limited to polysilicon, single crystal silicon, silicon dioxide and silicon nitride, because these materials had well-known properties and the fabrication techniques used were well defined due to extensive use in the IC field. Because of the limited processes and materials, early devices were typically made of 2-3 micron thick films, with only two silicon structural layers. In the years since, laboratories around the world have been applying new fabrication technologies to MEMS, including fusion bonding of wafers, deposition of thicker layers of polysilicon, Lithographie, Galvanoformung, Abformung (LIGA), Deep-Reaction Ion Etching (DRIE), Single Crystal Reactive Etching And Metallization (SCREAM), Surface Bulk Micromachining (SBM), Bosch Deep Silicon Etching, Deep X-Ray Lithography, and Inductively Coupled Plasma Etching. These new techniques and tools have allowed MEMS devices to achieve thicker layers, straighter side-walls, and multiple-layer designs, thus making MEMS designs much more complex and useful. However, in order for these micro-systems to advance to other commercial applications, further innovation is needed in a number of areas, including actuation.

One key advantage of MEMS technology is that the actuation device can be built on the same chip as the electronics, power systems, and RF links. This combination of mechanical and electrical parts on a single chip enables MEMS-made devices to have a complete electromechanical system wherein all components are fabricated at the same time. The development of MEMS actuators and sensors also has a significant value in the overall miniaturization of electromechanical devices, by reducing size, mass, volume, power, and sensitivity to vibrations. However, where macro-world actuator systems can be made of integrated parts that can be machined from all directions, MEMS actuator systems to date must have material deposited and etched from either the top or bottom side of a wafer. This method creates a two dimensional (2D) stackable layer structure, due to these unique MEMS fabrication methods. This 2D approach to designing actuators makes miniaturization of the macro design to the micro-scale difficult. Another technical challenge in MEMS is that mechanical design on the microscopic level follows different design rules than on the macro-level. For instance, the physical force caused by electrostatic charge is usually disregarded on the macroscopic level, but it becomes a significant force in micron-sized devices.

SUMMARY OF THE INVENTION

In accordance with the invention, there is provided, as a MEMS actuator, a linear electrostatic motor device or arrangement including a movable member or structure, referred to herein as a "shuttle," that can be moved over distances which are in excess of 250 microns and which, in general, are only limited by the size of the chip on which the device is located. The microscopic size actuation device can be used, for example, to move a miniature sensor or optical component within an instrument and to move the component with a smooth scanning motion or in a precise stepping motion.

In accordance with one aspect of the invention, there is provided a translation device for a microelectromechanical system, the device comprising, implemented in a microelectromechanical architecture:

first and second linear stator assemblies disposed in spaced relation and defining an elongate channel therebetween, each of said stator assemblies comprising a plurality of stators arranged in a row along said channel so as to face said channel;

a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;

a plurality of electrical lines individually connected to alternate stators of a plurality of groups of the stators of said first and second stator assemblies; and current supply means for sequentially supplying current through said electrical lines to said alternate stators so as to effect charging of the stators in a predetermined sequence such as to produce a tangential capacitive force causing translating movement of the shuttle along said channel.

The device preferably further comprises a pair of rails disposed on opposite sides of said channel so as to define side walls of said channel, said shuttle being grounded through contact with said side walls.

In an important implementation, the stators of said first and second stator assemblies extend substantially perpendicular to the channels and connector portions of the alternate stators of said first and second stator assemblies are of different lengths, the electrical lines comprise a plurality of conductive elements extending parallel to said channel and perpendicular to said stators, and each of the conductive elements electrically connects connector portions of the stators which are of a common length to the current supply means. Advantageously, the stators comprise elongate stator elements cantilever mounted on said conductive elements or suspended in a non-conductive material. In an advantageous embodiment, the stators are of three different lengths, the plurality of conductive elements comprises two pairs of three conductive elements, and the conductive elements of each pair are connected to all stator elements of one of the three lengths.

More generally, in a preferred embodiment, the stators of the first and second stators are grouped in groups of three stators, the groups are arranged in a repeated serial sequence, and the plurality of electrical lines comprises three lines and each of the three electrical lines is connected to one of the three stators of each group.

In another important implementation, the rails both include inwardly facing angled contact surfaces, the base portion of the shuttle member comprises a pair of downwardly depending, oppositely angled conductive members, and the conductive members each include an outwardly facing surface disposed in spaced parallel relation with a respective angled contact surface of one of said rails and in electrical contact with the respective surface.

Advantageously, the shuttle member includes a plurality of projections extending outwardly from said opposite sides thereof for preventing stiction between shuttle and rail angled surfaces.

In another implementation, lubrication provided between shuttle and rail angled surfaces prevents significant stiction forces between the two surfaces.

Preferably, the shuttle member comprises a base portion which contacts and rides between said rails, providing side stability to the shuttle and electrical contact between the shuttle and the base portion. In an important embodiment, the base portion includes a plurality of projections extending outwardly from opposite sides so as to contact the rails.

In another important embodiment, the device further comprises a pair of grounded conductive rails disposed on opposite sides of the channel so as to define the channel, the rails each include an inwardly facing surface and the shuttle member includes outwardly facing surfaces on said opposite sides thereof each disposed in spaced, parallel relation with one of said inwardly facing surfaces of said rails so as to form a gap therebetween, with the spaced rotors and stators forming a gap on each on opposite sides of said shuttle member of a width greater than the gaps formed between the rails and the shuttle member on opposite sides of the shuttle member.

In a further preferred embodiment, the rotors are equally spaced apart laterally and the stators are equally spaced apart laterally by an amount such that when a first rotor of said plurality of rotors is aligned with a first stator, the next laterally spaced rotor is positioned so as to be equispaced from the next two stators of the plurality of stators.

In another preferred embodiment, the rotors are equally spaced apart laterally and the stators are equally spaced apart laterally by an amount such that when a first stator of said plurality of stators is aligned with a first rotor, the next laterally spaced stator on one side of the first stator is positioned so as to overlap a rotor of the plurality of rotors in one direction, while the next laterally spaced stator on the opposite side of the first stator is positioned so as to overlap a further rotor of said plurality of rotors in the opposite direction.

In a preferred embodiment, a grounded shield beam is provided between adjacent stators so as to reduce cross-talk between the stators.

According to a further aspect of the invention, there is provided, in combination, a semiconductor chip and a translation device for a microelectromechanical system mounted in the chip, the translation device comprising:

first and second linear stator assemblies disposed in laterally spaced relation with an elongate channel therebetween, each of said stator assemblies comprising a plurality of stators arranged in a row along said channel so as to face said channel;

a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;

a plurality of electrical lines individually connected to alternate stators of a plurality of groups of the stators of said first and second stator assemblies; and a pair of grounded conductive rails disposed on opposite sides of said channel so as to define said channel, said rails each including an inwardly facing surface and said shuttle member including outwardly facing surfaces on said opposite sides thereof disposed in spaced, parallel relation with one of said inwardly facing surfaces of said rails so as to form a gap therebetween, the spaced rotors and stators forming a gap on each on opposite sides of said shuttle member of a width greater than the gaps formed between the rails and the shuttle member on opposite sides of the shuttle member; and current supply means for sequentially supplying current through said electrical lines to said alternate stators of said groups so as to effect charging of the stators in a predetermined sequence such as to produce a tangential capacitive force causing translating movement of the shuttle along said channel.

Preferably, the device further comprises a pair of rails disposed on opposite sides of said channel so as to define side walls of said channel, said shuttle being grounded through contact with said side walls.

In one important implementation, the stators of said first and second stator assemblies extend substantially perpendicular to said channels and are of a T-shaped construction including a base element extending substantially perpendicular to said channels and a bar element extending substantially parallel to said channel, the base elements of the alternate stators of said first and second stator assemblies being of different lengths, said electrical lines comprising a plurality of conductive elements extending parallel to said channel and perpendicular to said stators, each of said conductive elements electrically connecting alternating stators of a common length to said current supply means. Preferably, the stators comprise elongate stator elements cantilever mounted on said conductive elements. Advantageously, the stators are of three different lengths and said plurality of conductive elements comprise two pairs of three conductive elements, the conductive elements of each pair being connected to all stator elements of one of the three lengths.

Advantageously, the stators of said first and second stators are grouped in groups of three stators (although other groupings may be used) and said groups are arranged in a repeated serial sequence, and said plurality of electrical lines comprises three lines and each of the three electrical lines is connected to one of the three stators of each group.

In another important implementation, the rails both include inwardly facing angled contact surfaces and said base portion of said shuttle member comprises a pair of downwardly depending, oppositely angled conductive members each including an outwardly facing surface disposed in spaced parallel relation with a respective angled contact surface of one said rails and in electrical contact with the respective surface through at least one projecting portion of said surface.

As above, the shuttle member preferably includes a plurality of projections extending outwardly from said opposite sides thereof for making contact with ground.

Advantageously, the shuttle member comprises a base portion which contacts and rides between the rails. The base portion preferably includes a plurality of projections extending outwardly from opposite sides so as to contact said rails and provide grounding of the shuttle member.

Preferably, the rotors are equally spaced apart laterally and said stators are equally spaced apart laterally by an amount such that a first rotor of said plurality of rotors is aligned with a first stator, the next laterally spaced rotor is positioned so as to be equispaced from the next two stators of the plurality of stators.

Further features and advantages of the present invention will be set forth in, or apparent from, the detailed description of preferred embodiments thereof which follows.

DESCRIPTION OF THE PREFERRED EMBODIMENTS

Figure 1:
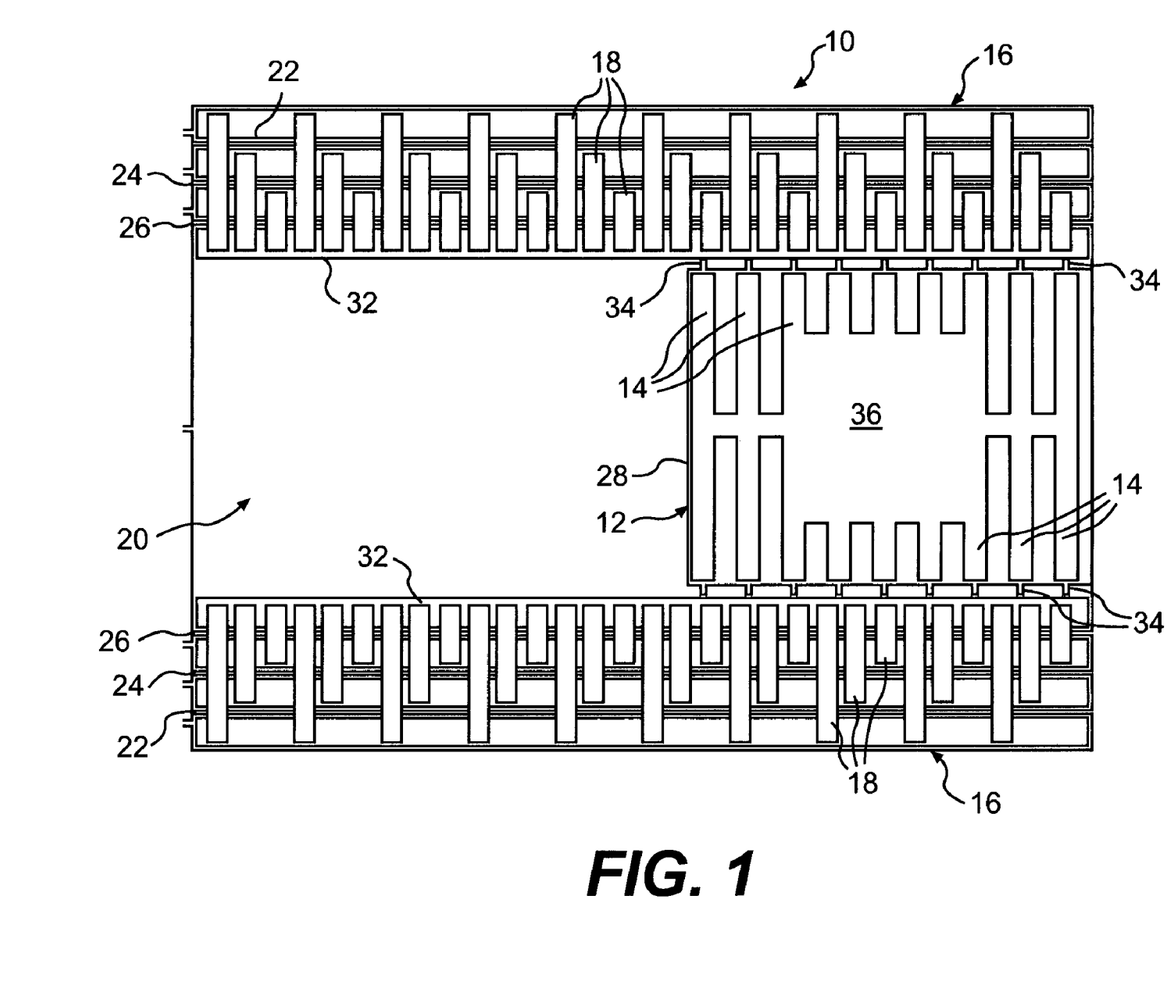
FIG. 1 is a plan view of a linear electrostatic motor device constructed in accordance with one preferred embodiment of the invention.
Figure 2:
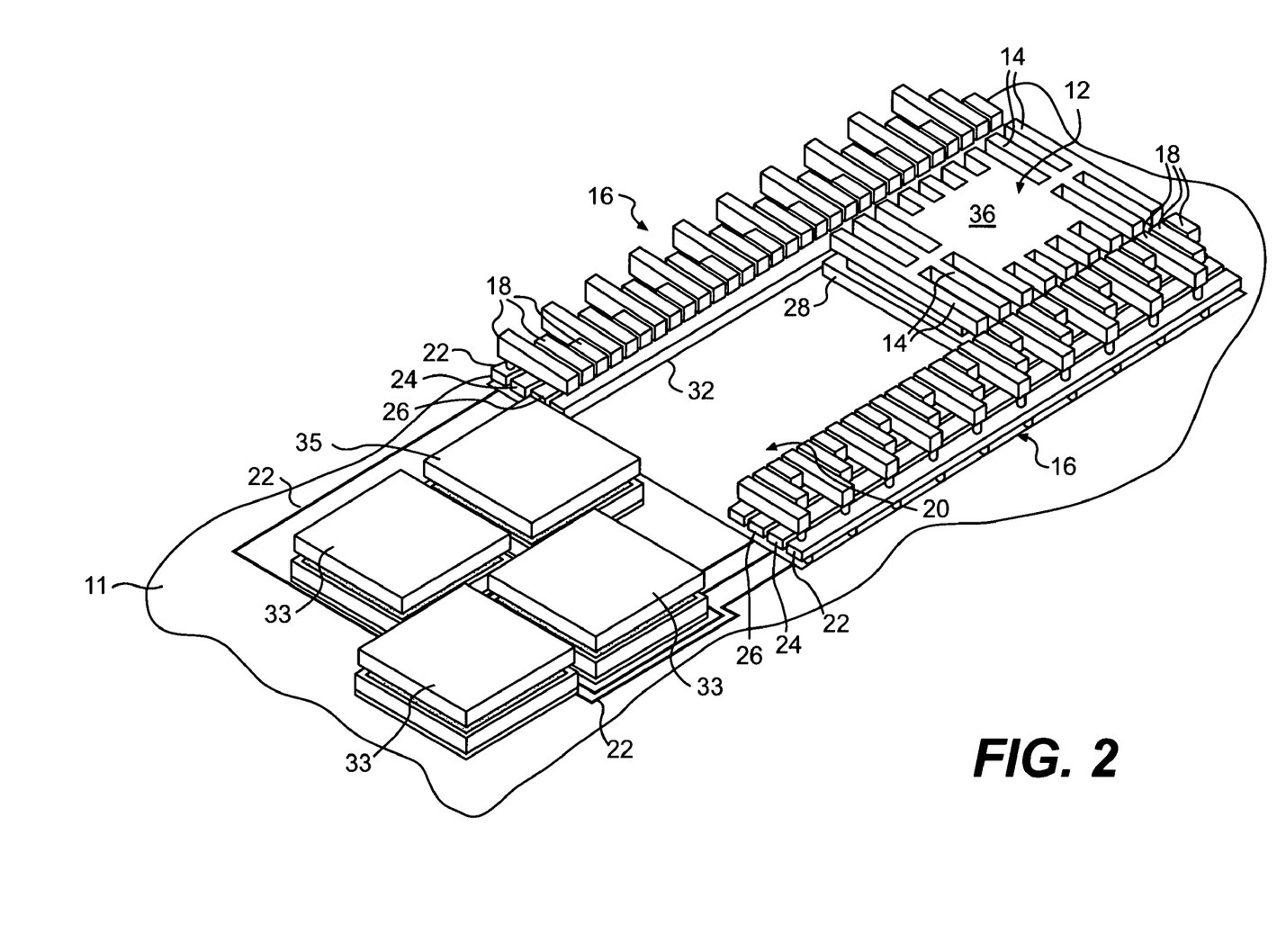
FIG. 2 is a perspective view of the device of FIG. 1.

Referring to FIGS. 1 and 2, there is shown a micro-translation stage or actuator in accordance with a first embodiment of the invention. The translation stage or actuator, which is generally denoted 10 and which, in use, is mounted on a substrate or chip indicated at 11, includes a translating shuttle 12 including a plurality of equally spaced, matching rotors 14 on opposite sides thereof and a pair of linear stationary stator assemblies 16 arranged on opposite sides of a central channel 20 along which shuttle 12 moves.

The stator assemblies 16 each include a plurality of equally spaced stators 18 which are arranged linearly along channel 20 and which individually extend perpendicularly to the longitudinal axis of channel 20, as illustrated. The gaps between shuttle 12 and the channel sides, as defined by rails 32, are smaller than the stator/rotor gaps so as to prevent the shuttle rotors 14 from coming into contact with the stators 18.

In the illustrated embodiment, stators 18 are grouped in groups of three (although other groupings may be used) and each stator 18 of each group is connected to a different one of three different electrical lines denoted 22, 24 and 26. There are ten such groups shown in FIGS. 1 and 2 but the number can vary depending, e.g., on the distance over which shuttle 14 is to travel. As illustrated, electrical line 22 is connected to the longest stator 18 in each group of three, electrical line 24 is connected to the next longest stator 18 in each group of three and electrical line 26 is connected to the shortest stator 18 in each group of three. Thus the same voltage and current are applied by line 22 to the longest stators of each group, and the same voltage and current are similarly applied by lines 24 and 26 to the next longest and shortest stators 18, respectively. The current lines 22, 24 and 26 are insulated and extend perpendicular to the stators 18 over the length of device 10, as illustrated. The alternating contact between the stators 18 of the respective group and the current lines 22, 24 and 26 allows voltage inputs to these control lines to control all of the stators 18, with each input supplying current to every third stator 18, as described above. By applying a sequencing voltage pattern to the stators 18, the shuttle 12 is caused to translate and, depending on the sequencing of the input charging of the stators, the shuttle 12 will travel in either direction.

Shuttle 12 includes a base portion or base 29, perhaps best seen in FIG. 2, on which rotors 14 are mounted and which rides on and between rails 32 which define channel 20. Stiction preventing projections or dimples 34 (see FIG. 1) are provided on opposite sides of base 28 in facing relation to a corresponding rail 32 so as to reduce the stiction forces exerted on shuttle 12. The electrical contact between base portion 28 and rails 32 provided by dimples 34 serves to ground shuttle 12.

The input voltages are applied to the pads 33 which are respectively connected to one of the lines 22, 24 and 26. A ground pad 35 is connected to ground rails 32. In the embodiment of FIGS. 1 and 2, lines 22, 24 and 26 are also in the form of rails, i.e., elongate rectangular cross section conductors, and stators 18 are mounted in a cantilevered configuration. With the application of voltages to conductors (rails) 22, 24 and 26, a charge travels down the conductors at the bottom of device 10 and then up and into the cantilevered stators 18.

A central mounting area 36 of shuttle 12 is used to mount a lens in the example discussed above or, of course, any other object to be translated.

In a preferred embodiment described in more detail below, the rotors 14 and stators 18 are constructed such that when one rotor 14 lines up with a respective stator 18, the next rotor 14 exactly straddles between the next two rotors 18.

Figure 3:
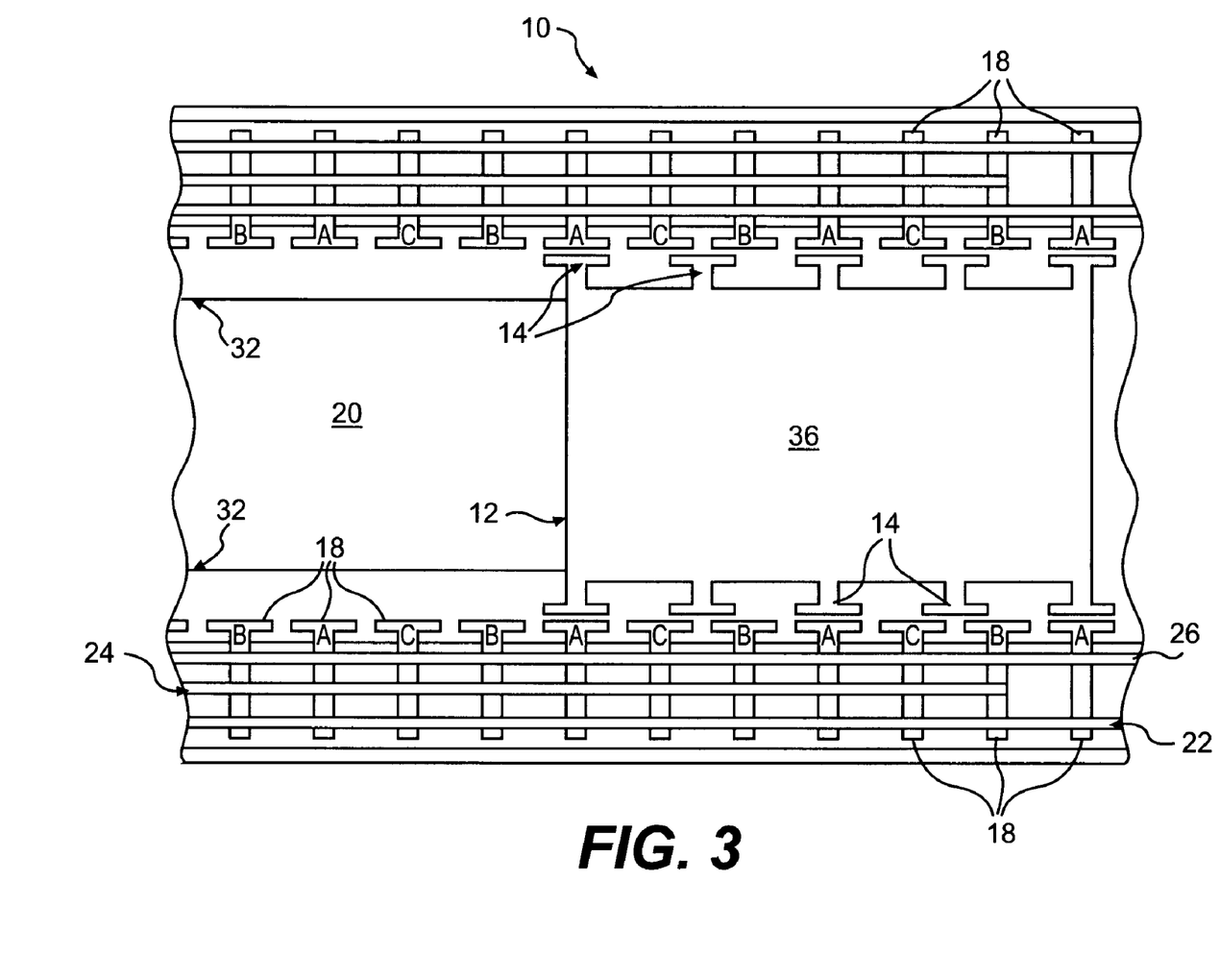
FIG. 3 is a schematic plan view similar to FIG. 1 which shows the stator-rotor layout of a further preferred embodiment.

An alternative implementation or embodiment of translation stage or actuator is shown in FIG. 3 wherein corresponding elements have been given the same reference numerals. In the schematic showing of FIG. 3, the stators 18 and rotors 14 are of a conventional T-shape and the shuttle 12 is of a simple rectangular shape. The stators 18 of each of the groups of three stators are denoted A, B and C and conductor 22 is the current line for all of the A stators 18, conductor 24 is the current line for all of the B stators 18, and conductor 26 is the current line for all of the C stators 18. Thus, FIG. 3 further illustrates, in a more schematic manner, the voltage connections to the individual stators 18 of the groups of stators and the relative layout of the rotors 14 and stator 18.

Figure 4:
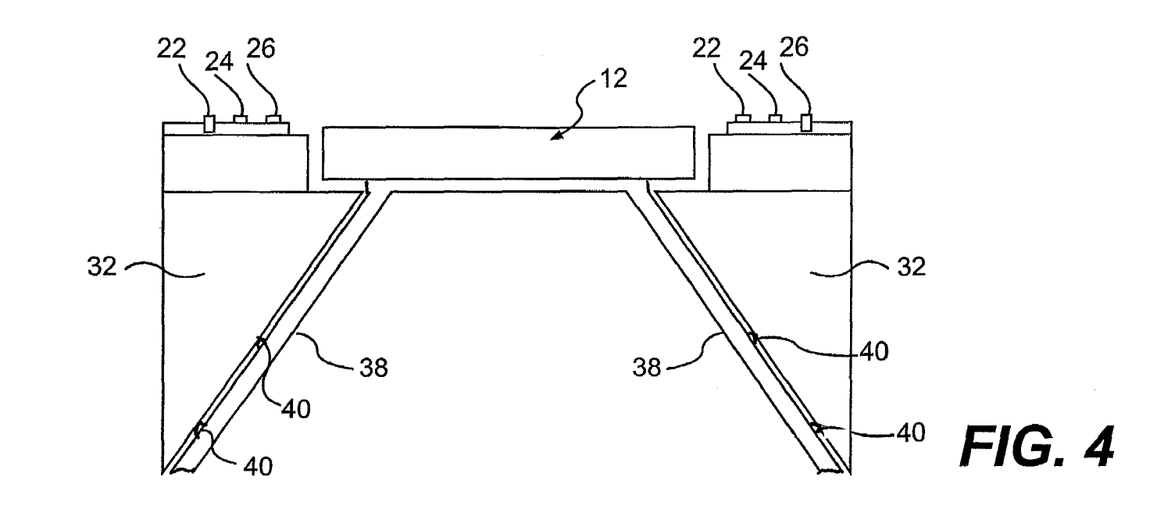
FIG. 4 is a side elevational view of a linear electrostatic motor device in accordance with an alternative embodiment of the invention, and with stators-rotors omitted.

FIG. 4 shows an alternative implementation or embodiment wherein the rotors 14 and the stators 18 are not shown and wherein rails 32 are of slanted configuration. As illustrated, in this embodiment, the base or undercarriage 28 of shuttle 14 includes a pair of angled members 38 which are disposed adjacent to the respective slant faces of rails 32 of channel 20. Dimples or projections 40 provide contact between members 38 and the corresponding slant faces of rails 32 and hence serve to ground shuttle 14. The provision of angled members 38 helps keep shuttle 12 centered within channel 20. It will be appreciated that this type of shuttle configuration can be used, for example, in the embodiment of FIG. 3.

Figure 5:
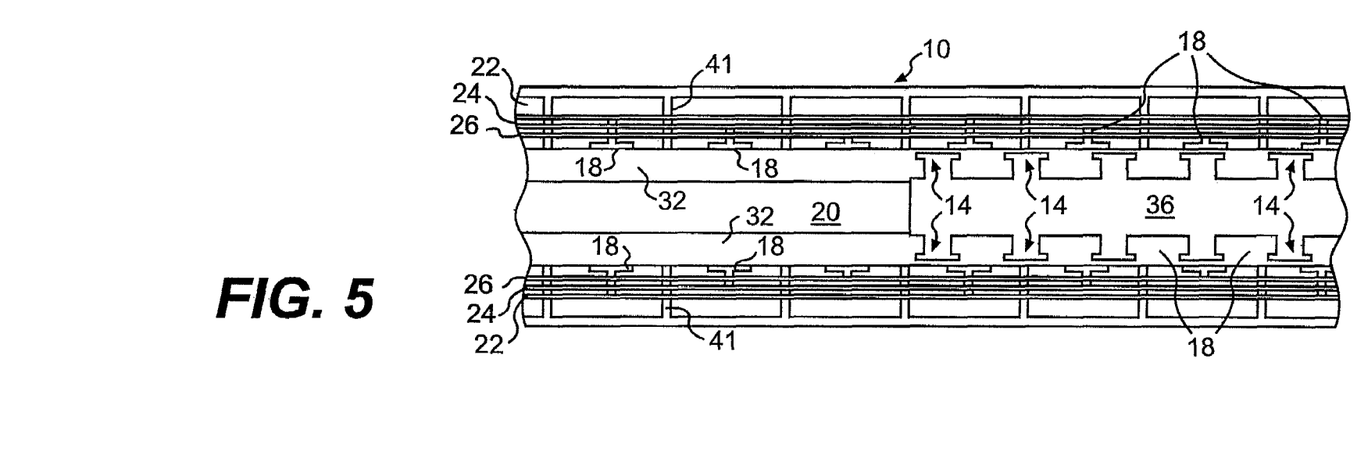
FIG. 5 is a schematic plan view similar to FIG. 1 which shows the stator-rotor layout of yet another preferred embodiment.

Yet another embodiment of the invention is shown in FIG. 5 wherein corresponding elements have been given the same reference numerals. In the schematic showing of FIG. 5, similarly to the embodiment of FIG. 3, the stators 18 and rotors 14 are of a conventional T-shape and the shuttle 12 is of a simple rectangular shape. FIG. 5 illustrates an alternative embodiment wherein the stator spacing is greater than the rotor spacing so that, referring to the right hand portion of FIG. 5, with one stator 18 and rotor 14 in alignment or registration, there is partial overlap of the adjacent rotors 14 on opposite sides with corresponding stators 18, as shown. A shielding beam 41 is placed between adjacent stators 18 to reduce cross-talk between stator groups. The beams 41 may be part of an integral beam construction 43. A shuttle configuration similar to that of FIG. 4 is preferably used in this embodiment.

The devices of FIGS. 1 and 2, FIG. 3, FIG. 4, and FIG. 5 can be manufactured using standard MEMS fabrication methods to build a device on a (typically) silicon wafer, and to provide the necessary electrical isolation between components, using a method wherein alternating layers of a conductive material (e.g., polysilicon) and a sacrificial material are deposited and etched, using masks and photoresist. At the end of the process, all of the sacrificial material is removed, which releases the shuttle structure, leaving the structure shown, e.g., in FIG. 1. In an alternative embodiment, the conductive material (e.g., polysilicon) can be pattern-doped rather than etched.

It will be appreciated that as the micro-translation stage or shuttle 12 travels linearly along channel 20, a number of electrical and mechanical forces are exerted on the shuttle 12. As indicated above, the stators 18 are electrically charged by the current supplied thereto, and charged stators 18 on either side of the shuttle 12 form capacitors with the corresponding rotors 14 on shuttle 12. The stator-rotor capacitors on one side of channel 20 create a normal or orthogonal capacitive force that cause the shuttle 12 to be pulled toward stators 18 while the stator-rotor capacitors on opposite side of channel 20 create a similar normal capacitive force that acts in the opposite direction and counteracts the first so that the net result is that these forces cancel one another.

The voltages on lines 22, 24 and 26 are switched on and off for the different stators 18 of the groups of stators (e.g., referring to FIG. 3, switching takes place essentially between the A stators, the B stators and the C stators) and the resultant changing capacitance along channel 20 produces a tangential capacitive force that produces the forward movement of the shuttle 12 along channel 20.

There are several forces acting against this forward force including the normal capacitive forces which tend to push the shuttle 12 against one side or the other of channel 20. This creates frictional forces which inhibits forward travel and causes wear. However, the symmetric arrangement of the stators 18 and rotors 14 acts to cancel out or greatly minimize any net force of this nature. Moreover, because the frictional faces of channel 20 are flat any wear should be substantially uniform. Frictional forces can be further reduced by using materials having a low coefficient of friction and/or using suitable lubricants.

Other capacitive forces between the charged stators 18 and the top of the shuttle members 38 causes the shuttle 12 to be pulled out of the plane of the paper as viewed in FIG. 3. This causes the shuttle 12 to slide further up the facing channel walls of channel rails 32, in the embodiment of FIG. 4, thereby assisting in keeping the shuttle 12 centered.

Significant stiction forces that could prevent start-up may also be encountered. As devices become smaller, the surface to volume ratio increases, making surface properties more important, particularly at the microscopic level. Stiction is the adhesion of two parts that may occur due to ionic and covalent chemical bonds and/or Vanderwaal bonds. Such stiction forces may also reduce the effect of desired capacitive forces discussed above, i.e., those forces which produce forward travel of the shuttle 12. The stiction forces can be reduced by the provision of dimples or projections 34 in FIGS. 1 and 40 in FIG. 4. These small radius projections or protrusions make the actual contact area relatively small. An alternative to using dimples or projections is to use lubricants between the contacting surfaces.

By increasing the tangential capacitive forces, forward shuttle movement can be assured, and maximizing of these forces enables the shuttle 12 to travel at higher accelerations, resulting in an increased response time for device 10. This can be achieved by the techniques described above as well as other techniques about to be described.

One purpose of the channel 20 formed by rails 32 is to prevent the stators 18 and rotors 14 from touching and thus the channel gap must also be less than the stator-rotor gap. As indicated above, channel 20 formed by rails 32 also provides a smooth surface for the shuttle 12 to slide along.

With an arrangement as shown in FIG. 3, using three stator voltages for stators A, B and C, the gap between the stators 18 is preferably chosen to equal to one-third of the width of the stator 18 so that the non-aligned rotor 14 (e.g., the rotor opposite stators C and B in FIG. 3) can be centered between the two stators 18 (stators C and B) with one-third of the two stators equally exposed to the unaligned rotor.

With an arrangement as shown in FIG. 5, using three stator voltages for stators A, B and C, the gap between the stators 18 is preferably equal to five-thirds the width of the stator 18 and the gap between rotors 14 is preferably chosen to equal the rotor width, so that the non-aligned rotors 14 will overlap the two unaligned stator groups by one-third, with each group overlapping in an opposite direction, as shown in FIG. 5.

It can be shown the desired net force can be linearly increased as the number of rotors 14 increases or as the thickness of the stators 18 and rotors 14 increases. It is also noted that this net force increases parabolically as the applied voltage increases and, as noted above, choosing a material with a low coefficient of friction will reduce the friction factor term. The stator-rotor gap should also be kept as small as possible, and, moreover, it has been found for the embodiments under consideration, that there is an optimum value for this gap for each value of the channel gap. By harmonizing these various parameters and using some of the other approaches described above, the driving force on the shuttle 12 can be maximized.

As indicated above, the micro-translation stage just described has a number of important applications including use in optical switching. Because the movement provided is linear translation, the distance over which shuttle 12 can be moved can, in general, be increased by simply increasing the length of the stator assemblies 16 and is basically only limited by the size of the associated chip (typically of a total size of 250 µm×100 µm×the travel distance).

In a specific, non-limiting example, analysis of a prototype device indicated that the device will travel 300 microns from start to stop, in less than 20 milliseconds, with driving forces generated on the order of $10^{-9}$ N.

Although the invention has been described above in relation to preferred embodiments thereof, it will be understood by those skilled in the art that variations and modifications can be effected in these preferred embodiments without departing from the scope and spirit of the invention.

What is claimed is:

1. A translation device for a microelectromechanical system, said device comprising, implemented in a microelectromechanical architecture:

first and second linear stator assemblies disposed in spaced relation and defining an elongate channel therebetween, each of said stator assemblies comprising a plurality of stators arranged in a row along said channel so as to face said channel;

a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;

a plurality of electrical lines individually connected to alternate stators of a plurality of groups of the stators of said first and second stator assemblies; and current supply means for sequentially supplying current through said electrical lines to said alternate stators so as to effect charging of the stators in a predetermined sequence such as to produce a tangential capacitive force causing translating movement of the shuttle along said channel;

said device further comprising a pair of rails disposed on opposite sides of said channel so as to define side walls of said channel, said shuttle being grounded through contact with said side walls.

2. A device in accordance with claim 1 wherein said stators of said first and second stator assemblies extend substantially perpendicular to said channels, connector portions of the alternate stators of said first and second stator assemblies are of different lengths, said electrical lines comprising a plurality of conductive elements extending parallel to said channel and perpendicular to said stators, each of said conductive elements electrically connecting stators of a common length to said current supply means.

3. A device in accordance with claim 2 wherein said stators comprise elongate stator elements cantilever mounted on said conductive elements.

4. A device in accordance with claim 3 wherein said stators comprise elongate stator elements suspended in, and supported by, a non-conductive material above said conductive elements.

5. A device in accordance with claim 3 wherein said stators are of three different lengths and said plurality of conductive elements comprises two pairs of three conductive elements, the conductive elements of each pair being connected to all stator elements of one of the three lengths.

6. A device in accordance with claim 1 wherein the stators of said first and second stators are grouped in groups of three stators and said groups are arranged in a repeated serial sequence, and said plurality of electrical lines comprises three lines and each of the three electrical lines is connected to one of the three stators of each group.

7. A device in accordance with claim 1 wherein said rails both include inwardly facing angled contact surfaces and said base portion of said shuttle member comprises a pair of downwardly depending, oppositely angled conductive members, said conductive members each including an outwardly facing surface disposed in spaced parallel relation with a respective angled contact surface of one of said rails and in electrical contact with the respective surface.

8. A device in accordance with claim 1 wherein said shuttle member includes a plurality of projections extending outwardly from said opposite sides thereof for making contact with ground.

9. A device in accordance with claim 1 wherein a lubricant is disposed between said shuttle member contacting surfaces forming said channel.

10. A device in accordance with claim 1 wherein said shuttle member comprises a base portion which contacts and rides between said rails.

11. A device in accordance with claim 10 wherein said base portion includes a plurality of projections extending outwardly from opposite sides so as to contact said rails and provide grounding of the shuttle member.

12. A device in accordance with claim 11 wherein a lubricant is disposed between said base portion and said rails.

13. A device in accordance with claim 1 wherein said rails comprise a pair of grounded conductive rails disposed on opposite sides of said channel so as to define said channel, said grounded rails each including an inwardly facing surface and said shuttle member including outwardly facing surfaces on said opposite sides thereof each disposed in spaced, parallel relation with one of said inwardly facing surfaces of said grounded rails so as to form a gap therebetween, the spaced rotors and stators forming a gap on each on opposite sides of said shuttle member of a width greater than the gaps formed between the grounded rails and the shuttle member on opposite sides of the shuttle member.

14. A device in accordance with claim 1 wherein the rotors are equally spaced apart laterally and said stators are equally spaced apart laterally by an amount such that when a first rotor of said plurality of rotors is aligned with a first stator, the next laterally spaced rotor is positioned so as to be equispaced from the next two stators of the plurality of stators.

15. A device in accordance with claim 1 wherein the rotors are equally spaced apart laterally, and said stators are equally spaced apart laterally by an amount such that when a first stator of said plurality of stators is aligned with a first rotor of said plurality of rotors, the next laterally spaced stator on one side of said first stator is positioned so as to overlap part of the next laterally spaced rotor on the same side of the first rotor, and the next laterally spaced stator on the opposite side of the first stator is positioned so as to overlap part of the next laterally spaced rotor on the opposite side of the first rotor.

16. A device in accordance with claim 1 further comprising a grounded shielding element positioned between adjacent stators.

17. In combination, a semiconductor chip and a translation device for a microelectromechanical system mounted in the chip, said translation device comprising:
   first and second linear stator assemblies disposed in laterally spaced relation with an elongate channel therebetween, each of said stator assemblies comprising a plurality of stators arranged in a row along said channel so as to face said channel;
   a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;
   a plurality of electrical lines individually connected to alternate stators of a plurality of groups of the stators of said first and second stator assemblies; and
   a pair of grounded conductive rails disposed on opposite sides of said channel so as to define said channel, said rails each including an inwardly facing surface and said shuttle member including outwardly facing surfaces on said opposite sides thereof disposed in spaced, parallel relation with one of said inwardly facing surfaces of said rails so as to form a gap therebetween, the spaced rotors and stators forming a gap on each on opposite sides of said shuttle member of a width greater than the gaps formed between the rails and the shuttle member on opposite sides of the shuttle member; and
   current supply means for sequentially supplying current through said electrical lines to said alternate stators of said groups so as to effect charging of the stators in a predetermined sequence such as to produce a tangential capacitive force causing translating movement of the shuttle along said channel.

18. A device in accordance with claim 17 further comprising a pair of rails disposed on opposite sides of said channel so as to define side walls of said channel, said shuttle being grounded through contact with said side walls.

19. A device in accordance with claim 17 wherein said stators of said first and second stator assemblies extend substantially perpendicular to said channel and connection portions of the alternate stators of said first and second stator assemblies are of different lengths, said electrical lines comprising a plurality of conductive elements extending parallel to said channel and perpendicular to said stators, each of said conductive elements electrically connecting connector portions of a common length to said current supply means.

20. A device in accordance with claim 19 wherein said stators comprise elongate stator elements cantilever mounted on said conductive elements.

21. A device in accordance with claim 19 wherein said stators comprise elongate stator elements suspended in, and supported by, a non-conductive material above said conductive elements.

22. A device in accordance with claim 19 wherein said stators are of three different lengths and said plurality of conductive elements comprise two pairs of three conductive elements, the conductive elements of each pair being connected to all stator elements of one of the there lengths.

23. A device in accordance with claim 17 wherein the stators of said first and second stators are grouped in groups of three stators and said groups are arranged in a repeated serial sequence, and said plurality of electrical lines comprises three lines and each of the three electrical lines is connected to one of the three stators of each group.

24. A device in accordance with claim 18 wherein said rails both include inwardly facing angled contact surfaces and said base portion of said shuttle member comprises a pair of downwardly depending, oppositely angled conductive members each including an outwardly facing surface disposed in spaced parallel relation with a respective angled contact surface of one said rails and in electrical contact with the respective surface.

25. A device in accordance with claim 17 wherein said shuttle member includes a plurality of projections extending outwardly from said opposite sides thereof for making contact with ground.

26. A device in accordance with claim 17 wherein a lubricant is disposed between said shuttle member and contacting surfaces forming said channel.

27. A device in accordance with claim 18 wherein said shuttle member comprises a base portion which contacts and rides between said rails.

28. A device in accordance with claim 27 wherein said base portion includes a plurality of projections extending outwardly from opposite sides so as to contact said rails and provide grounding of the shuttle member.

29. A device in accordance with claim 28 wherein a lubricant is disposed between said base portion and said rails.

30. A device in accordance with claim 17 wherein the rotors are equally spaced apart laterally and said stators are equally spaced apart laterally by an amount such that a first rotor of said plurality of rotors is aligned with a first stator, the next laterally spaced rotor is positioned so as to be equispaced from the next two stators of the plurality of stators.

31. A device in accordance with claim 17 wherein the rotors are equally spaced apart laterally, and said stators are equally spaced apart laterally by an amount such that when a first stator of said plurality of stators is aligned with a first rotor of said plurality of rotors, the next laterally spaced stator on one side of said first stator is positioned so as to overlap part of the next laterally spaced rotor on the same side of the first rotor, and the next laterally spaced stator on the opposite side of the first stator is positioned so as to overlap part of the next laterally spaced rotor on the opposite side of the first rotor.

32. A device in accordance with claim 17 further comprising a grounded shielding element positioned between adjacent stators.

33. A translation device for a microelectromechanical system, said device comprising, implemented in a microelectromechanical architecture:
   first and second linear stator assemblies disposed in spaced relation and defining an elongate channel therebetween, each of said stator assemblies comprising a plurality of stators arranged in a row along said channel so as to face said channel;
   a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;
   a plurality of electrical lines individually connected to alternate stators of a plurality of groups of the stators of said first and second stator assemblies;
   current supply means for sequentially supplying current through said electrical lines to said alternate stators so as to effect charging of the stators in a predetermined sequence such as to produce a tangential capacitive force causing translating movement of the shuttle along said channel; and
   said shuttle member including a plurality of projections extending outwardly from said opposite sides thereof for making contact with ground.

34. A translation device for a microelectromechanical system, said device comprising, implemented in a microelectromechanical architecture:
   first and second linear stator assemblies disposed in spaced relation and defining an elongate channel therebetween, each of said stator assemblies comprising a plurality of stators arranged in a row along said channel so as to face said channel;
   a shuttle member disposed in said channel between said stator assemblies for translating movement therealong, said shuttle member including a plurality of rotors extending outwardly from opposing sides thereof facing said stator assemblies in spaced relation to the stators of said stator assemblies, said shuttle being grounded and including a mounting area for an object to be translated;
   a plurality of electrical lines individually connected to alternate stators of a plurality of groups of the stators of said first and second stator assemblies;
   current supply means for sequentially supplying current through said electrical lines to said alternate stators so as to effect charging of the stators in a predetermined sequence such as to produce a tangential capacitive force causing translating movement of the shuttle along said channel; and
   a grounded shielding element positioned between adjacent stators.

* * * * *